United States Patent [19]
Duff et al.

[11] Patent Number: 5,123,283
[45] Date of Patent: Jun. 23, 1992

[54] DIAMETRAL CHANGE SENSOR FOR A CYLINDRICAL MEMBER

[75] Inventors: Winslow K. Duff, Export; James T. Polidora, North Huntingdon, both of Pa.

[73] Assignee: Westinghouse Electric Corp., Pittsburgh, Pa.

[21] Appl. No.: 550,275

[22] Filed: Jul. 9, 1990

[51] Int. Cl.$^5$ .............................................. G01L 1/22
[52] U.S. Cl. .................................... 73/760; 73/862.62
[58] Field of Search ................. 73/788, 779, 780, 826, 73/862.62, 818, 862.39, 730, 760; 33/1 P

[56] References Cited

U.S. PATENT DOCUMENTS

| | | | |
|---|---|---|---|
| 4,484,479 | 11/1984 | Eckhardt | 73/730 X |
| 4,543,725 | 10/1985 | Golinelli et al. | 33/178 |
| 4,587,739 | 5/1986 | Holcomb et al. | 33/143 |
| 4,930,228 | 6/1990 | Anderson et al. | 33/788 |
| 4,936,150 | 6/1990 | Burke et al. | 33/788 |
| 5,020,773 | 6/1991 | Tuft et al. | 251/129.12 |

FOREIGN PATENT DOCUMENTS

0357966 2/1990 European Pat. Off. .
WO88/08491 7/1988 World Int. Prop. O. .
WO90/00246 12/1990 World Int. Prop. O. .

Primary Examiner—Jerry W. Myracle

[57] ABSTRACT

A sensing device for determining diametral changes of a cylindrical member which includes a clamp member having a body adapted to be positioned around the periphery of the cylindrical member and removably attached in at least partially spaced relationship to a portion of the cylindrical member. A proximity sensor attached to the body senses diametral changes in the cylindrical member and generates signals responsive to and representative of the sensed diametral changes. A computation unit connected to the proximity sensor receives the signals therefrom and determines the axial load on the cylindrical member, based on the diametral changes. Temperature sensors may be provided on the cylindrical member and the body for generating signals indicative of the respective temperatures of the cylindrical member and the body, which signals are transmitted to the computation unit and which, in response thereto, compensates for any temperature changes of the cylindrical member and the body in determining the axial load on the cylindrical member.

47 Claims, 5 Drawing Sheets

DIAMETRAL CHANGE SENSOR FOR A CYLINDRICAL MEMBER

BACKGROUND OF THE INVENTION

1. Field of the Invention

The present invention relates to an improved device for measuring diametral changes in a cylindrical member and, more particularly, to such a device which measures diametral changes in a cylindrical member whereby axial loads on the cylindrical member may be determined.

2. Description of the Related Art

In many industries, it is important to measure the variable dynamic axial loads imposed on a work piece such as a cylindrical member. This is particularly true in the nuclear power industry where Motor Operator Valves (MOV's) are extensively used. It is important that these valves are set and maintained correctly at all times since correct operation is critical to health and safety as well as to proper operation of the system in which the MOV's are used. MOV's typically include a valve, a motor operator attached to the valve through a stem and yoke means extending partially around the valve stem for connecting the operator housing and the valve housing. The best measure for accurately monitoring the dynamic events within an MOV is by the direct measurement of the valve stem axial load.

It is possible to determine the axial load or strain in a valve stem or any other generally cylindrical member from changes in the stem or cylindrical member diameter. The ratio of diametral change to axial elongation for a material, referred to as Poisson's ratio, is known. Therefore, by measuring the diametral change on the valve stem or other cylindrical member, axial strain and therefore valve stem axial load can be determined.

There has long been need for a device which can accurately monitor and measure the dynamic operation of valves or other thrust bearing cylindrical members continuously during operation thereof.

One current device for determining the axial load on a valve stem is a device which senses the changes in clamp means attached around the valve stem. As diametral changes occur in the valve stem, the clamp portion moves in response to diametral changes in the clamped portion of the stem. A sensor is provided to sense movement of the clamp portion of the device in response to the diametral changes. The sensed changes in the clamp means may be bending in the clamp portion of the device or distance changes between parts of the clamp portion of the device. A signal storage device, which also may be a computer, stores the signals from the sensor for real time or delayed determination of axial loading in the stem or other cylindrical member. Such a device is shown, for example, in Leon et al. U.S. Pat. No. 4,911,004.

One disadvantage of the clamp type sensor such as that shown in Leon et al. U.S. Pat. No. 4,911,004 is that the clamp is quite bulky and cannot continuously travel with the stem during substantially the length of travel thereof. Moreover, the clamp can only be used to initially measure the stem load and this measurement is then used to calibrate another measuring device mounted on the yoke of the valve whereby the stem load is indirectly measured based on the strain in the valve yoke. This leads to many inaccuracies such as those caused by bending moments in the yoke, the fact that the yoke response is non-linear and can vary over the valve stroke and that the yoke load measuring device is sensitive to flow induced yoke vibration and valve stem harmonic imbalance. Additional inaccuracies in using a clamp type sensor can occur as a result of the fact that a stem has a normal stiffness and when the clamp is securely attached thereto, the normal stiffness changes.

A further problem with a method for determining valve stem load by measuring yoke strain is that the yoke sensor must be calibrated to a direct stem sensor prior to each use. Moreover, the yoke sensor must be permanently installed with one sensor per valve. Such sensors also can be difficult and time consuming to install.

Another device for measuring valve stem load is shown in Charbonneau et al. U.S. Pat. No. 4,542,649 which employs a system that measures displacement of a spring pack associated with the motor actuator of a MOV as an indicator of forces in the valve system. This spring pack deflection type device suffers from the disadvantage of being time consuming to install and calibrate. Moreover, spring pack deflection is proportional to motor torque and does not measure stem thrust. In addition, the spring pack deflection type devices can introduce errors of plus or minus 50% due to factors such as spring pack non-linearity, spring pack rate of loading and mechanical loss issues, the assumption that the spring pack deflection per unit thrust is the same in both directions and the fact that a spring pack device is calibrated in the out direction only into a load cell having a different stiffness than the valve seat.

Another device for measuring valve stem thrust loads in a cylindrical member such as a valve stem is disclosed in Branam et al. U.S. Pat. No. 4,856,327 wherein valve stem thrust loads in an MOV are monitored and measured by the use of load cells installed directly between the valve and the operator of the MOV. Again, however, this type of device does not take measurements directly on the valve stem and inaccuracies can occur as a result of vibration, temperature changes, etc.

Accordingly, there is still a need for an improved device for accurately and continuously directly monitoring and measuring the axial load in a cylindrical member such as a valve stem throughout a substantial portion of the length of travel of the cylindrical member and which as well may rotate with the cylindrical member. There is a further need for such a device which also can compensate for temperature changes in the cylindrical member as well as in the measuring device itself.

SUMMARY OF THE INVENTION

It is an object of the present invention to provide a device for determining diametral changes of a cylindrical member.

It is another object of the present invention to provide a device for continuously and directly measuring and determining the axial load on a movable valve stem throughout a substantial portion of its length of travel.

It is yet another object of the present invention to provide a device for continuously and directly determining the axial load on a movable valve stem which is capable of moving with the stem throughout a substantial portion of its stroke and as well may rotate with the stem while still continuously measuring the axial load thereon.

It is a further object of the present invention to provide such a device which also is capable of compensating for temperature changes in the cylindrical member as well as in the measuring device itself.

It is yet another object of the present invention to provide such a device which is relatively simple in construction and may be easily installed on a cylindrical member for movement therewith to continuously measure the axial load on the member during use.

It is another object of the present invention to provide such a device which employs proximity sensing means to determine diametral changes in the cylindrical member in order to determine axial loads thereon.

It is still a further object of the present invention to provide a gauging device for measuring the diameter of a cylindrical member whereby the device may be slid along the length of the cylindrical member to measure any diametral changes in the cylindrical member along its length.

The present invention achieves the above and other objects by providing a sensing device for measuring diametral changes of a cylindrical member comprising a clamp member having a body adapted to be positioned around the periphery of the cylindrical member. Means are provided for removably attaching the body of the clamp member in at least partially spaced relationship to a portion of the cylindrical member. Proximity sensing means are attached to the body of the clamp member for sensing diametral changes in the cylindrical member and for generating signals responsive to and representative of the sensed movement. Computation means are connected to the proximity sensing means for receiving the signals therefrom to determine the axial load on the cylindrical member.

In one embodiment, one of the parts of the body is rigid and the other part is elastic with the proximity sensing means being mounted on the rigid part. In another embodiment the body of the clamp is ring-shaped and each of the parts is semi-cylindrical in configuration. In still another embodiment one of the parts is U-shaped, having two spaced apart legs forming an open end and another of the parts is a connecting member mounted in the open end and attached to the legs with the proximity sensing means being mounted on the connecting member.

The device further includes spacer means mounted on the body of the clamp for maintaining at least the portion of the body having the proximity sensor means thereon in spaced relationship to the cylindrical member. The spacer means may be adjustable to accommodate different size cylindrical members. The spacer means also may be rigid on one side of the body and elastic on an opposite side of the body containing the proximity sensing means.

The device further may include temperature measuring means on one or both of the cylindrical member and the body of the clamp for generating signals indicative of the temperatures of the cylindrical member and/or the body and means for transmitting the temperature signals to the computation means whereby the computation means compensates for any temperature changes in the cylindrical member and/or the body in determining the axial load on the cylindrical member.

One embodiment of the invention also constitutes a gauging device for measuring the diameter of a cylindrical member. The gauging device comprises a clamp member having a body adapted to be positioned around the periphery of the cylindrical member and includes means for removably attaching the body in at least a partially spaced relationship to a portion of the cylindrical member. The body is comprised of a rigid portion and an elastic portion in one embodiment and a rigid body held in place by an external support fixture in another embodiment. Proximity sensing means mounted on the rigid portion sense any diametral changes in the cylindrical member. The proximity sensing means generates signals responsive to any sensed diametral changes. Computation means are provided for receiving the signals from the proximity sensing means to determine any diametral changes in the cylindrical member. The body further may be slid along the length of the cylindrical member to sense any diametral changes therein, i.e., variations in diameter along the axial length of the body. Temperature measuring means also may be mounted on one or both of the cylindrical member and the body and signals indicative of the temperature fed to the computation means for compensation therefor.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
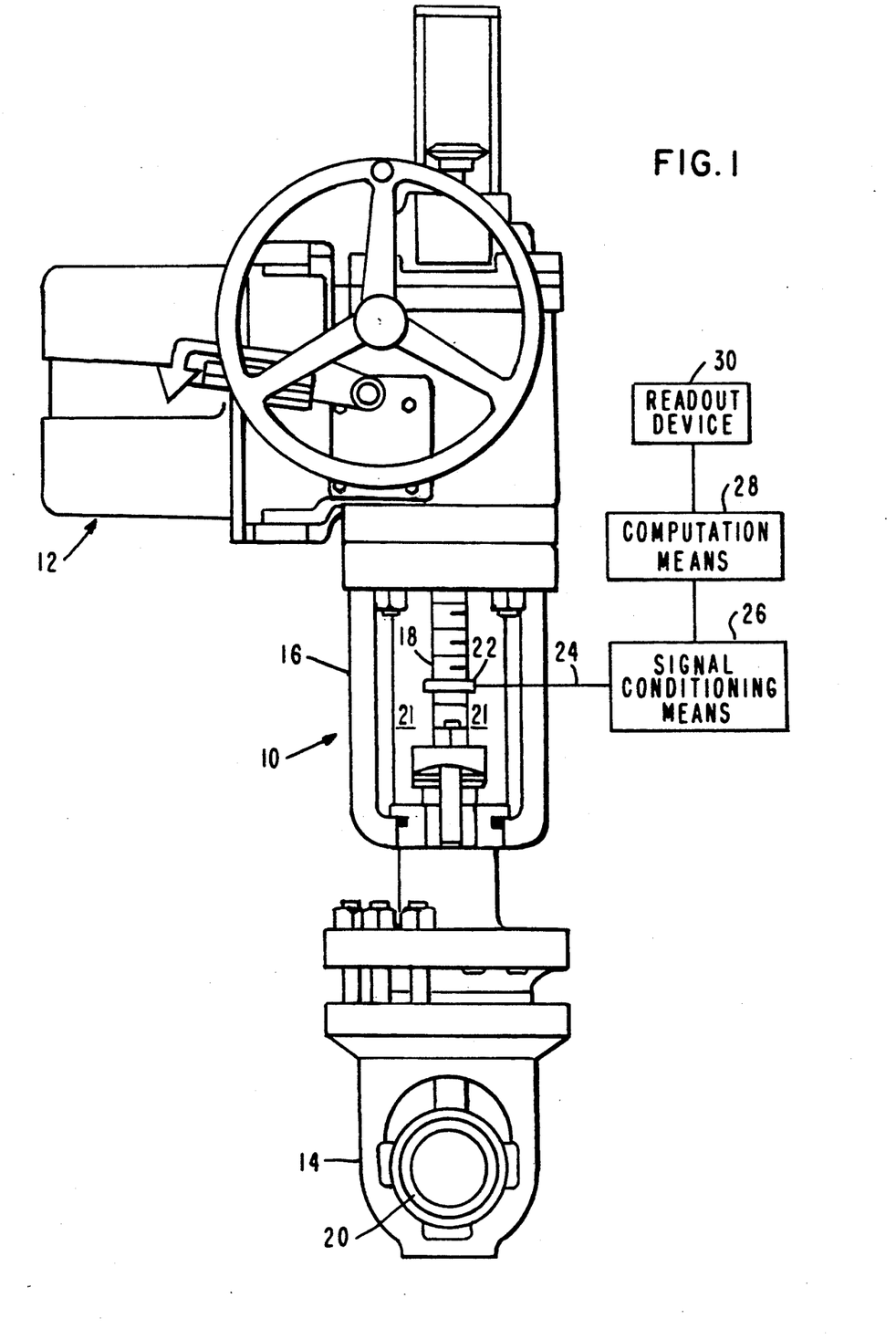
FIG. 1 is an elevational view of a motor operated valve provided with a sensing device mounted on the valve stem for measuring and determining the axial load thereon according to the present invention.

Referring to the drawings, shown in FIG. 1 is a motor operated valve assembly generally comprised of a motor operator 12 and a valve 14 connected by a yoke 16. The yoke extends partially around, and defines a spatial envelope 21 surrounding, a valve stem 18 which connects the valve 14 to the motor operator 12. Only a portion of the axial length of the valve stem is accessible, i.e., the portion within the spatial envelope 21. The valve 14 has a valve gate 20 which is connected to the valve stem so as to be movable between a closed or seated position in which it is engaged with the valve seat and an open or back seated position in which it engages a valve back seat. The valve gate 20 is shown in a closed or seated position in FIG. 1. The motor operated valve 10 is of a type which is generally well known and is readily commercially available.

A sensing device 22 is mounted on the valve stem 18 as shown in FIG. 1 for measuring diametral changes in the valve stem under various load conditions. The sensing device 22 is of minimal axial length, comprising only a small fraction of the axial length of the valve stem which is accessible within the spatial envelope 21, and may be mounted either on the threaded portion or the smooth portion of the stem. The sensing device generates signals responsive to the sensed diametral changes and the signals are transmitted via suitable means such as cable 24 to a signal conditioning means 26 from where they are sent to computation means 28. The computation means may be programmed to determine axial load from the diametral changes in the stem. A read out device 30 is connected to the computation means to provide an indication of the axial load on the stem as it is moving. The indication can be a simple numeral read out or a plot of axial load verses time or axial load verses valve position.

Figure 2:
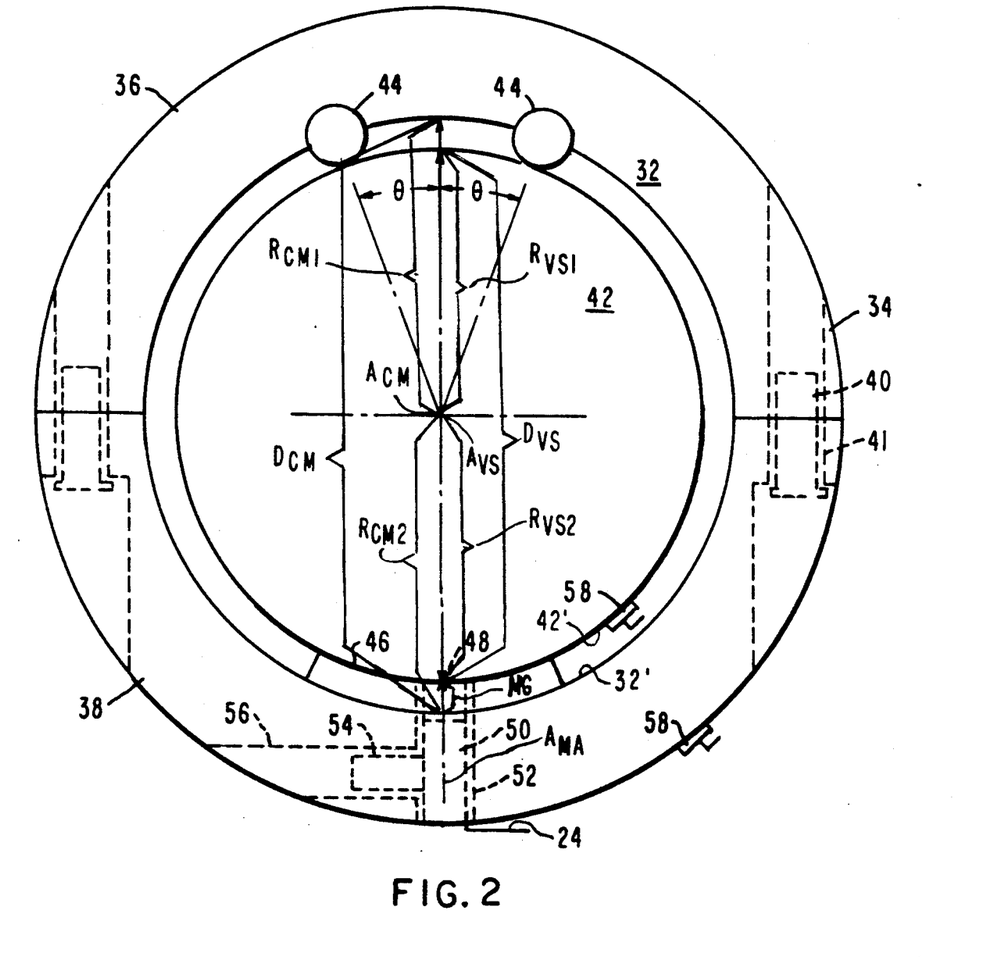
FIG. 2 is a top plan view of a first embodiment of a sensing device of the present invention showing the device mounted around a cylindrical member and having a pair of spaced inserts partially embedded in the body thereof on one side and a spacing layer of elastic material mounted on the inner surface of the body on another side adjacent a proximity sensor means.

In the embodiment of the sensing device 22 shown in FIG. 2, the device includes a generally cylindrical or ring shaped clamp member 32 having a clamp body 34 comprised of two semi-cylindrical halves 36 and 38 fastened together by any suitable means such as threaded screws 40 mounted in threaded internal passageways 42 in the clamp body. The clamp body is shown in FIG. 2 mounted around the periphery of a cylindrical member 42, representing, for example, the valve stem 19 in FIG. 1. The clamp body may be made of any suitable material such as steel, aluminum or fiber reinforced plastic. As illustrated in FIG. 2, the axes $A_{VS}$ and $A_{CM}$ of the valve stem 42 and clamping member 32, respectively, are preferably substantially aligned in a non-loaded state of the cylindrical member/valve stem 42 and thus the assembled valve stem 42 and clamping member 32 are in substantially coaxial relationship, with their respective diameters $D_{VS}$ and $D_{CM}$ aligned with each other and with a radial measurement axis $A_{MA}$ transverse to the axes $A_{VS}$ and $A_{CM}$; the respective radial components, i.e., $R_{VS1}$ and $R_{VS2}$ likewise are aligned with $R_{CM1}$ and $R_{CM2}$.

As shown in FIG. 2, the top half 36 of the clamp body has a pair of spaced inserts 44 which are embedded in the clamp body whereby a portion of the periphery of each insert protrudes inwardly from the inside of the clamp to serve as a contact point with the cylindrical member 42. The inserts preferably are each spaced at an angle $\theta$ of approximately 20° from a line passing through the center of the clamp body. The inserts may be made of hardened steel and function to center the clamp around the cylindrical member.

The other half 38 of the clamp body is provided with an elastic means such as elastic layer 46 on the inner surface thereof with the layer being centered in the middle of the body half 38 at a point directly opposite the side of the clamp member in which the inserts 44 are embedded. The elastic layer may be comprised of any suitable elastic material such as rubber. Other suitable elastic means may also be used such as spring pusher members or Bellville washers. The dimensions of the clamp body do not change with the diametral changes in the cylindrical member because the elastic means moves (i.e., resiliently compresses, or yields, and expands) with the diametral changes of the valve stem, or cylindrical member 42 (i.e., expansion or contraction, respectively).

The elastic layer has an opening 48 therein defining a measurement gap MG between the exterior cylindrical surface to permit proximity sensing means 50 to sense diametral changes in the cylindrical member 42. The exterior surface 42' of the cylindrical member/valve stem 42 and the interior surface 32' of the clamp member 32, at the effective intersections thereof with the commonly radially aligned measurement axis $A_{MA}$ and diameters $D_{VS}$ and $D_{CM}$ (and their corresponding radial components), define a measurement gap MG. While shown as extending between the surfaces 42' and 32', the measurement gap MG in fact may be considered as extending along the radially aligned measurement axis $A_{MA}$ from the surface 42' to any desired, pre-established reference position, or portion, of the member 38—e.g., in the embodiment of FIG. 2, the proximity sensing means 50, later discussed. The proximity sensing means may be any suitable distance measuring device such as a Linear Voltage Differential Transmitter (LVDT), a proximity capacitive or inductive probe, a laser or other suitable optical means or a strain gauge displacement transmitter. The proximity sensing means 50 may be mounted in the clamp body by being threadably inserted through an opening 52 in the clamp body half 38 and may be further secured in the opening by a set screw 54 threaded into an opening 56 in the clamp body half. Signals generated by the proximity sensing means 50 are transmitted to the signal conditioning means 26 by cable 24 in the manner set forth with respect to FIG. 1.

An advantage of this embodiment is that the inserts 44 provide rigid contact points on one side of the clamp and the elastic layer provides a non-rigid surface on the sensor side in contact with the cylindrical member to guarantee that the clamp won't deform to any significant extent in response to diametral changes in the cylindrical member. Thus and for example, as the cylindrical member 42 expands, contact points 44 will cause the top half 36 of the clamp body 32 to move therewith, producing a displacement (upward, in the plan view of FIG. 2) of the clamp member axis $A_{CM}$ from the cylindrical member/valve stem axis $A_{VS}$ by an amount which is linearly proportional to $\Delta R_{VS1}$ (i.e., to take into account the angle $\theta$) while maintaining alignment of the diameters $D_{CM}$ and $D_{VS}$ and producing a first component of change of the measurement gap MG. The measurement gap MG will change by a total amount equal to the sum of that first component, linearly proportional to $\Delta R_{VS1}$, and a second component comprising $\Delta R_{VS2}$. While preferred, the initial coaxial relationship of members 42 and 32, and thus the alignment of the axes $A_{CM}$ and $A_{VS}$, is not critical; instead, what is important is the alignment of the diameters $D_{CM}$ and $D_{VS}$ (and the corresponding radial components thereof) with the radial measurement axis $A_{MG}$ and that at least a part of the interior surface 32' of the clamp member 32, which part includes the reference portion 50 defining the measurement gap MG, is spaced from the corresponding portion of the interior surface 42' of the cylindrical member/valve stem 42 such that the part of the clamp member which defines the radius $R_{CM2}$ does not deform to any significant extent as a result of the diametral deformation of the member 42—i.e., $R_{CM2}$ is a fixed value. As will also be apparent, the fixed radius $R_{CM2}$ must be greater than the variable radius $R_{VS2}$ of the cylindrical member/valve stem 42 (i.e., that radius being variable due to the diametral deformations of the member 42, caused by axial loading thereof) so as to maintain a minimum finite value of the measurement gap MG. Moreover, the elastic layer serves to dampen vibrations and therefore increase the accuracy of the measurement. The elastic layer also permits use with different sized diameter cylindrical members. Moreover, the sensing device shown in FIG. 2 is relatively simple in construction and compact in size and when used in connection with a valve stem, is capable of being mounted on the stem and travel with the stem throughout the length of the stroke of travel thereof and as well may rotate with the valve stem to continuously measure the axial load in the stem during travel thereof.

In the embodiment shown in FIG. 2, means may be provided for compensating for temperature variations in the cylindrical member and the body of the clamp sensing device. This may be accomplished by attaching temperature measuring devices 58 to the surface of the cylindrical member and to the surface of the clamp body. The temperature measuring device also could be embedded within the clamp body. Suitable temperature measuring devices include a resistance temperature detector, a thermistor and a thermocouple. The readings from the temperature measuring devices are sent to the signal conditioning means 26 and from there are sent to the computation means 28 whereby compensation may be made for any temperature change in the cylindrical member and the body of the clamp.

Figure 3:
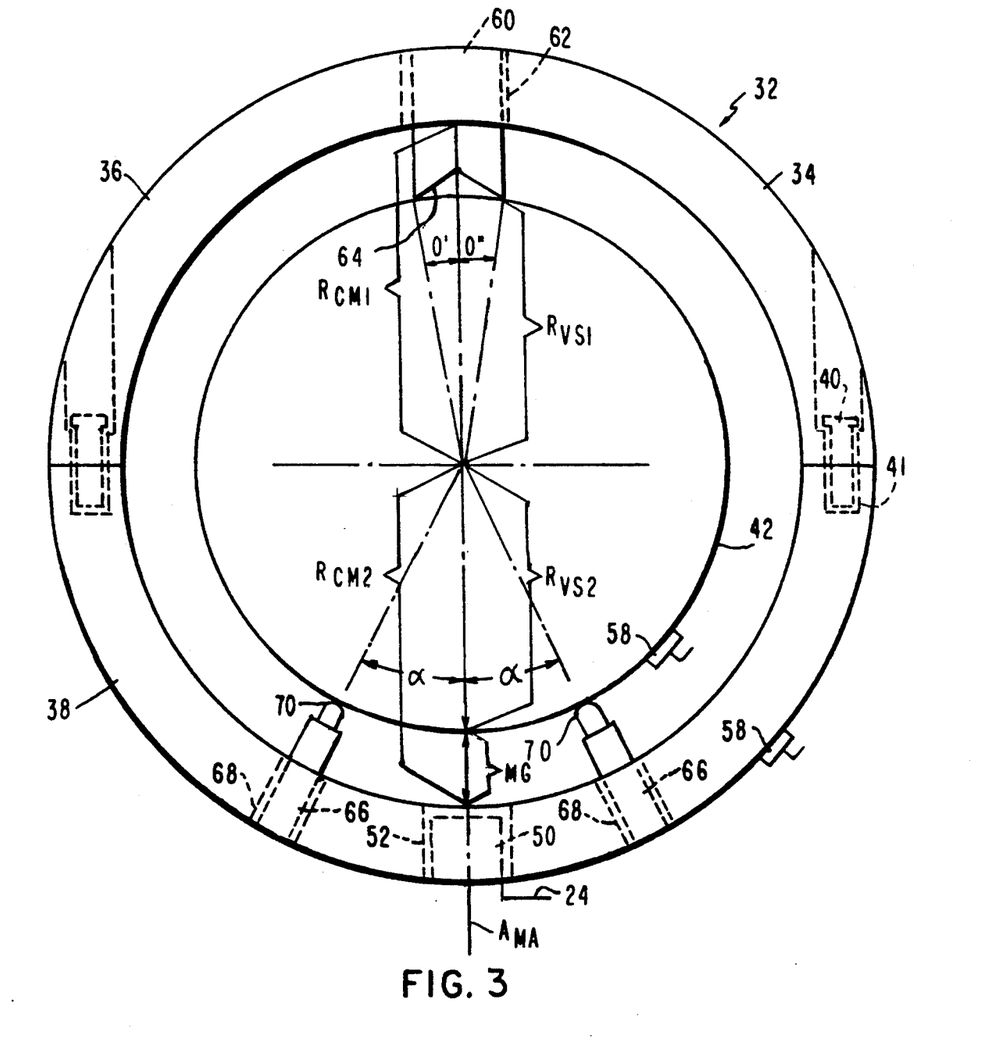
FIG. 3 is a top plan view of a second embodiment of the invention showing the sensing device mounted around a cylindrical member and having a threaded spacer means on one side and spring biased retaining member on the other side adjacent the proximity sensing means.

The embodiment of the sensing device shown in FIG. 3 is similar to the sensing device shown in FIG. 2 in that it also includes a generally cylindrical ring shaped clamp member 32 having a clamp body 34 comprised of two semi-cylindrical halves 36 and 38 fastened together by any suitable means such as threaded screws 40 mounted in threaded internal passageways 42 in the clamp body. The clamp body is shown mounted around the periphery of a cylindrical member 42 and likewise to define a measurement gap MG. The clamp body may be made of any suitable material such as steel, aluminum or fiber reinforced plastic.

As shown in FIG. 3, the top half 36 of the clamp body has an adjustable threaded clamping screw 60 threadably mounted in opening 62 with the screw having a V-shaped contact surface 64 on the inner end thereof whereby the ends of the V each come to a point and function to help center the clamp on the cylindrical member. The point contacts of the V-shaped contact surface 64 define angles $\theta'$, which may be smaller than the angles $\theta$ of the FIG. 2 structure. The bottom half 38 of the clamp body has a pair of spaced screw inserts 66 threadably mounted therein in openings 68. Each of the inserts 66 has a spring biased pusher member 70 on its inner end thereof for contacting the cylindrical member to assist in holding the clamp on the cylindrical member and center the clamp thereon. Each of the inserts is spaced at an angle $\alpha$ of approximately 20 from a center line passing through the clamp body. The screw inserts with the spring biased pusher members permit the device to be used with different sized diameter cylindrical members. In operation, the cylindrical member is placed inside the joined clamp body and fixed between the clamping screw 60 and the screw inserts with the spring loaded pusher members 70. The dimensions of the clamp body do not change with the diametral changes in the cylindrical member since the spring loaded pusher members move radially either outwardly or inwardly, adjusting to the diametral changes of the cylindrical member. The measurement gap MG of the FIG. 3 structure varies in the same manner as does the measurement gap MG of FIG. 2.

Proximity sensing means 50 may be mounted in the clamp body by being threadably inserted through an opening 52 in body half 38. Although not specifically shown in FIG. 3, the proximity sensing means may further be secured in the opening 52 by a set screw in the same manner as shown with respect to the embodiment of FIG. 2. Signals generated by the proximity sensing means 50 may be transmitted to the signal conditioning means 26 by cable 24. Temperature measuring devices 58 may also be attached to the cylindrical member and the clamp body whereby the signals from the device are sent to the signal conditioning means in the manner as described with respect to the embodiment of FIG. 2.

Figure 4:
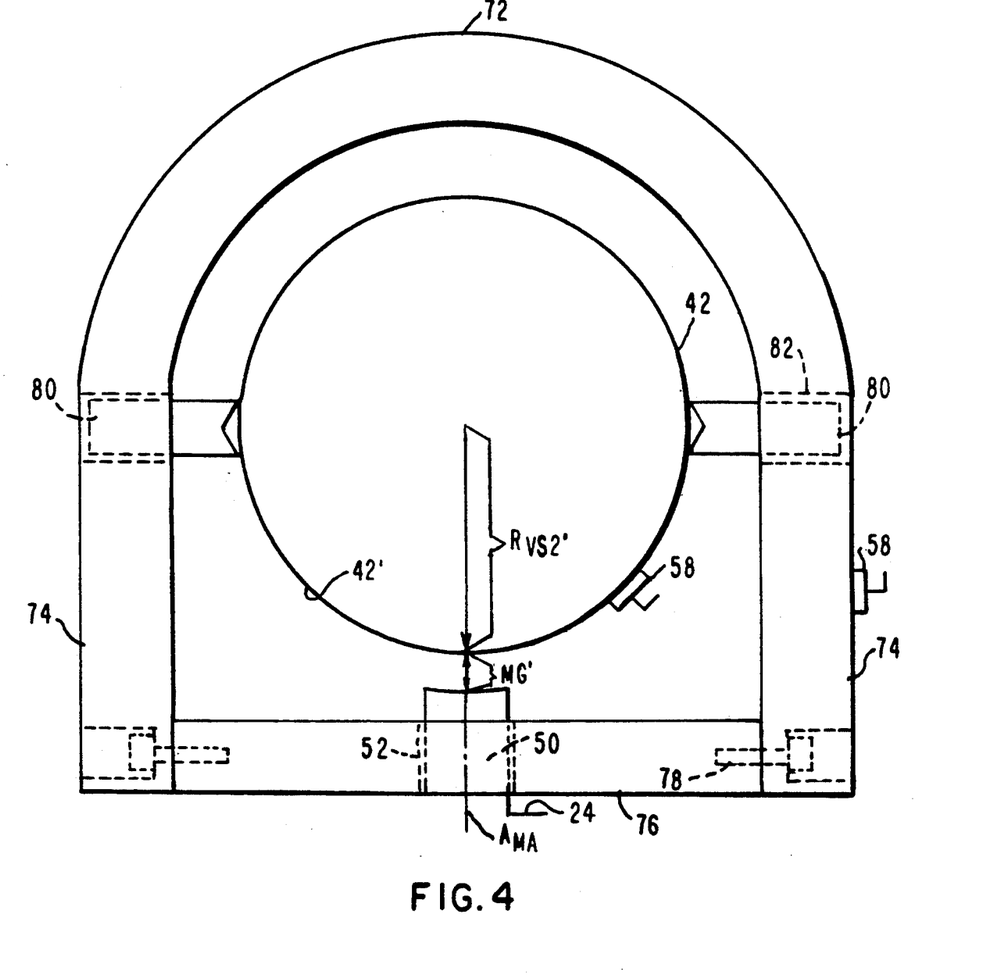
FIG. 4 is a top plan view showing a third embodiment of the sensing device of the present invention mounted around a cylindrical member and being in the form of a generally U-shaped clamp having a connecting member mounted in the open end thereof on which the proximity sensing means is mounted.

In the embodiment of the sensing device 22 shown in FIG. 4, the clamp body is comprised of a U-shaped member 72 having two spaced apart legs 74 forming an open end in which a connecting member 76 is securely mounted by suitable means such as screws 78 passing through the ends of the legs and into the ends of the connecting member. A pair of clamping screws 80 are threadably mounted in openings 82 in opposite sides of the legs of the V. Similar to the clamping screw in the embodiment of FIG. 3, the clamping screws 80 each have a V-shaped inner contact surface whereby the ends of the V each come to a point and function to center the clamp body on the cylindrical member 42. In operation, the U-shaped member 72 and the connecting member 76 are securely joined together around the cylindrical member and the clamping screws 80 are then adjusted to contact the surface of the cylindrical member and securely hold the clamp body in place.

The connecting member 76 has a proximity sensing device 50 threadably mounted in an opening 52 therein for sensing the diametral changes in the cylindrical body. Signals generated by the proximity sensing means may be transmitted to the signal conditioning means by cable 24 in the same manner as that described with respect to the embodiment of FIG. 2. Similarly, temperature measuring device 58 may be mounted on the cylindrical member and the clamp body whereby the readings from the temperature measuring device are sent to the signal conditioning means 26 and from there to the computation means 28 whereby compensation may be made for any temperature change in the cylindrical member and the body of the clamp.

It is noted that in this embodiment the cylindrical member is clamped and securely held at diametrally opposed positions on its circumferential surface, or periphery, by the clamping screws 80 and that therefore the proximity sensing means measures changes in the radius of the cylindrical member. Using the same nomenclature as in FIG. 2 but with prime indications, the measurement gap MG' in FIG. 4 between the exterior stem surface 42' and the reference portion 50 changes directly in accordance with $\Delta R_{VS2'}$. Diametral changes in the cylindrical member can be accurately deduced by multiplying the radial changes by a factor of two. Since the original no load radius of the cylindrical member is known, the proximity sensing means can be calibrated and any changes in the radius measured by the sensor.

The corresponding axial load on the member can then be calculated using known equations.

Figure 5:
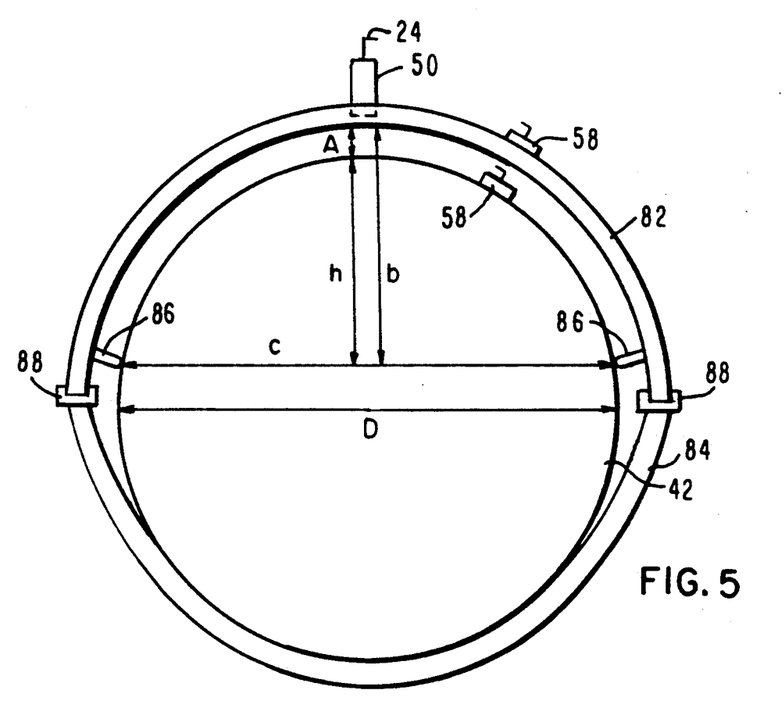
FIG. 5 is a top plan view of a fourth embodiment of the sensing device of the present invention mounted around a cylindrical member and having a rigid portion and an elastic portion.

In the embodiment of the sensing device 22 shown in FIG. 5, the clamp body is comprised of a rigid part 82 and an elastic part 84. The rigid part is semi-cylindrical in shape and may be made of steel, aluminum or fiber reinforced plastic. Mounted adjacent the ends of the rigid part 82 are a pair of oppositely disposed contact points 86 which contact the circumferential surface of the cylindrical member 42 and maintain the rigid part in spaced relation to the cylindrical member. As shown in FIG. 5, the contact points 86 contact the cylindrical member at intersections of the surface thereof and a cord c which is of less length than the diameter of the cylindrical member. In this manner, the rigid part of the clamp body won't come into contact with the cylindrical member. The cord c preferably is between 0.8 and 0.95 the length of the diameter D of the cylindrical member. The ends of the elastic part 84 are connected to the ends of the rigid part 82 by any suitable means 88 such as bracket means, clamp means or the like. The elastic part may be made of any suitable elastic material such as rubber or coil springs. The elastic part maintains the clamp body in position around the cylindrical member.

A proximity sensing means 50 is mounted in at the center of the rigid part 82 by any suitable means such as a threaded connection. Signals generated by the proximity sensing means may be transmitted to the signal conditioning means 26 by cable 24 in the manner set forth with respect to FIG. 1. Temperature measuring devices 58 also may be mounted on each of the cylindrical member and the rigid part of the clamp body. Readings from the temperature measuring devices are sent to the signal conditioning means 26 and from there sent to the computation means 28 whereby compensation may be made for any temperature changes in the cylindrical member and the rigid part of the clamp body.

In operation of the sensing device of FIG. 5, as the cylindrical member expands or contracts, the elastic part permits the rigid part of the clamp to move radially outwardly or inwardly (i.e., upwardly or downwardly, respectively, in the transverse axial cross-sectional view of FIG. 5) thus varying the distance between, the proximity sensing device and the opposed outer surface of the cylindrical member. By measuring the changes in this distance, the axial load in the cylindrical member may be calculated. The proximity sensing device measures the changes in a measurement gap A (the distance between the surface of cylindrical member along the measurement axis, as before-defined, and the reference portion of the rigid part of the clamp body) caused by the changes in the diameter of the cylindrical member. Gap A will change because as the diameter of the cylindrical member changes, the rigid portion of the clamp body is displaced such that contact points 86 engage the surface of the cylindrical member at points defined by intersections with another cord, since the aperture of the rigid part remains constant.

The cord length c is related to the radius r by the following equation:

$$c = \sqrt{4(2hr - h^2)} = \sqrt{8hr - 4h^2}$$

where h is as defined in FIG. 5 as the distance along a center line, i.e., a portion of the radius of the cylindrical member 42 between cord c and the outer surface of the cylindrical member, aligned with the corresponding radius of the rigid part 82. Solving for h:

$$c^2 = 8hr - 4h^2$$

$$r = \frac{c^2 + 4h^2}{8h}$$

$$h = \frac{8r - \sqrt{64r^2 - 16c^2}}{8}$$

and knowing from FIG. 5:

$$h = b - A$$

A can be solved for in terms of b, r, c:

$$A = b - \frac{8r - \sqrt{64r^2 - 16c^2}}{8}$$

Changes in gap length A are related to the radial changes by the following equation:

$$\Delta r = \frac{c^2 + 4(b - A_o)^2}{8(b - A_o)} - \frac{c^2 + 4(b - A)^2}{8(b - A)}$$

where $A_o$ is the original gap length, and A is the gap length under axial load.

The sensing device of FIG. 5 may also be applied to a range of different sized diameter cylindrical members because once the initial gap ($A_o$) is calibrated, the relative changes can be recorded.

The sensing device of FIG. 5 also has a significant general application as a gauging device for checking the diameter of any cylindrical member since it can be put on a cylindrical member and slid along the length thereof to check for any variations in diameter. The device could be used, or example, to check the constancy of the diameter of a fuel rod in a nuclear system.

Figure 6:
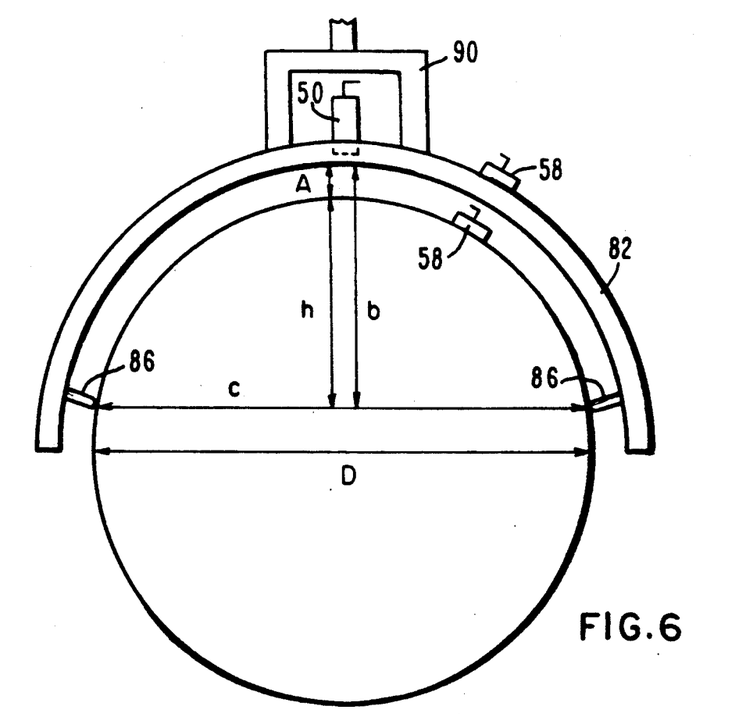
FIG. 6 is a top plan view of a fifth embodiment of the sensing device of the present invention mounted on a portion of a cylindrical member and held in place by an external support fixture.

The embodiment of the sensing device of FIG. 6 is similar to the sensing device of FIG. 5 except the elastic part 84 has been removed and the sensing device held in place by an external support fixture 90 such as a robotic arm or other manufacturing fixture. The external support structure may be adapted to move the rigid body part 82 along the length of the cylindrical member.

With the sensing device of FIGS. 5 and 6, as well as with the sensing devices shown in FIGS. 2, 3 and 4 it is no longer necessary to calculate the relationship between the changes in the clamp means corresponding to diametral changes in the cylindrical member and then calculate the axial load. The diametral changes may be taken directly. Also the sensing devices are not susceptible to bending moments in the cylindrical member and are relatively insensitive to errors in measuring the nominal diameter of the cylindrical member.

Numerous alterations and modifications of the structure herein disclosed will suggest themselves to those skilled in the art. It is to be understood, however, that the present disclosure relates to the preferred embodiments of the invention which is for the purpose of illustration only and is not to be construed as a limitation of the invention. All such modifications which do not depart from the spirit of the invention are intended to be included within the scope of the appended claims.

We claim:

1. A device for determining diametral changes of a cylindrical member, said diametral changes representing diametral deformations of the cylindrical member produced by, and mathematically related to, respective axial loads imposed on the cylindrical member, comprising:

a clamp member having a body;

means for removably mounting the body of said clamp member on, and in at least partial spaced relationship to, a portion of said cylindrical member and thereby directly supporting the clamp member on the portion of said cylindrical member; and proximity sensing means attached to said body for directly sensing diametral changes in said cylindrical member and for generating signals responsive to and representative of the sensed diametral changes and, correspondingly, the respective, mathematically related axial loads.

2. A device for determining diametral changes of a cylindrical member as set forth in claim 1, wherein said body is comprised of at least two parts fastened together.

3. A device for determining diametral changes of a cylindrical member as set forth in claim 2, wherein one of said parts is rigid and the other of said parts is elastic, said proximity sensing means being mounted on said rigid part.

4. A device for determining diametral changes of a cylindrical member as set forth in claim 2, wherein said body is ring shaped and each of said parts is semi-cylindrical in configuration.

5. A device for determining diametral changes of a cylindrical member as set forth in claim 2, wherein one of said parts is U-shaped having two spaced apart legs forming an open end and the other of said parts is a connecting member mounted in said open end and attached to said legs, said proximity sensing means being mounted on said connecting member.

6. A device for determining diametral changes of a cylindrical member as set forth in claim 1, wherein said means for removably mounting said body includes spacer means for maintaining at least a portion of said body to which said proximity sensor means is attached, in spaced relationship to said cylindrical member.

7. A device for determining diametral changes of a cylindrical member as set forth in claim 6, wherein said spacer means are adjustable to accommodate different sized cylindrical members.

8. A device for determining diametral changes of a cylindrical member as set forth in claim 6, wherein said spacer means are rigid on one side of said body and elastic on an opposite side of said body containing said proximity sensing means.

9. A device for determining diametral changes of a cylindrical member as set forth in claim 8, wherein said rigid spacer means comprises at least one insert member mounted in said body and said elastic spacer means comprises spring biased pusher members.

10. A device for determining diametral changes of a cylindrical member as set forth in claim 8, wherein said rigid spacer means comprise inserts partially embedded in said body so as to protrude inwardly from the inner surface of said body and wherein said elastic spacer means comprises a layer of elastic material mounted on the inner surface of said body.

11. A device for determining diametral changes of a cylindrical member as set forth in claim 1, wherein said cylindrical member is a movable valve stem in a valve assembly and said clamp member is movable with said stem throughout a substantial portion of its stroke.

12. A device for determining diametral changes of a cylindrical member as set forth in claim 11, wherein said valve assembly is a motor operated valve assembly.

13. A device for determining diametral changes of a cylindrical member as set forth in claim 1, wherein said clamp member is supported on said cylindrical member so that diametral changes in the cylindrical member do not result in any significant changes in the clamp member.

14. A device for determining diametral changes of a cylindrical member as set forth in claim 1, wherein said mounting means includes an external support fixture attached to said body for holding said body in contact with said cylindrical member.

15. A device for determining diametral changes of a cylindrical member as set forth in claim 14, wherein said body is semi-cylindrical in configuration.

16. A device for determining diametral changes of a cylindrical member comprising:

a clamp member having a body;

means for removably mounting the body of said clamp member on, and in at least partial spaced relationship to, a portion of said cylindrical member;

proximity sensing means attached to said body for directly sensing diametral changes in said cylindrical member and for generating signals responsive to and representative of the sensed diametral changes; and computation means connected to said proximity sensing means for receiving the signals from said proximity sensing means and determining therefrom the axial load on said cylindrical member.

17. A device for determining diametral changes of a cylindrical member as set forth in claim 16, which further includes temperature measuring means, in temperature-sensing association with said cylindrical member, for generating signals indicative of the temperature of said cylindrical member and means for transmitting said temperature indicative signals to said computation means, said computation means responding thereto for compensating for any temperature changes of said cylindrical member in determining the axial load on said cylindrical member.

18. A device for determining diametral changes of a cylindrical member as set forth in claim 16, which further includes temperature measuring means, in temperature-sensing association with said body, for generating signals indicative of the temperature of said body and means for transmitting said temperature signals to said computation means, said computation means responding thereto for compensating for any temperature changes of said body in determining diametral changes of said cylindrical member.

19. A device for determining the axial load on a cylindrical member as set forth in claim 16, which further includes temperature measuring means, in temperature-sensing association with both said cylindrical member and said body, for generating corresponding signals indicative of the respective temperatures of said cylindrical member and said body and means for transmitting said corresponding temperature indicative signals to said computation means, said computation means responding thereto for compensating for any temperature changes of said cylindrical member and said body in determining the axial load on said cylindrical member.

20. A valve stem load monitoring system for monitoring the axial load on a valve stem comprising:
a clamp member having a body;
means for removably mounting the body of said clamp member in at least partial spaced relationship to a portion of said stem;
proximity sensing means attached to said body for directly sensing diametral changes in said valve stem and for generating signals responsive to and representative of the sensed diametral changes; and
computation means connected to said proximity sensing means for receiving the signals from said proximity sensing means and determining therefrom the axial load on said valve stem.

21. A valve stem monitoring system as set forth in claim 20, wherein said stem is movable and said clamp member is movable with said stem throughout a substantial portion of its stroke.

22. A valve stem monitoring system as set forth in claim 20, wherein said valve stem is a movable valve stem in a motor operated valve assembly.

23. A valve stem monitoring system as set forth in claim 20, which further includes temperature measuring means on said stem for generating signals indicative of the temperature of said stem and means for transmitting said temperature indicative signals to said computation means, said computation means responding thereto for compensating for any temperature changes of said stem in determining the axial load on said stem.

24. A valve stem monitoring system as set forth in claim 20, which further includes temperature measuring means, in temperature-sensing association with said body, for generating signals indicative of the temperature of said body and means for transmitting said temperature indicative signals to said computation means, said computation means responding thereto for compensating for any temperature changes of said body in determining the axial load on said stem.

25. A valve stem monitoring system as set forth in claim 20, which further includes temperature measuring means, in temperature-sensing association with said stem and said body, for generating signals indicative of the temperatures of said stem member and said body and means for transmitting said temperature indicative signals to said computation means, said computation means responding thereto for compensating for any temperature changes of said stem and said body in determining the axial load on said stem.

26. A valve stem load monitoring system for monitoring the axial load on a valve stem comprising:
a clamp member having a body;
means for removably mounting the body of said clamp member in at least partial spaced relationship to a portion of said valve stem;
proximity sensing means attached to said body for directly sensing diametral changes in said valve stem and for generating signals responsive to and representative of the sensed diametral changes; and
temperature measuring means on both said valve stem and said body for generating signals indicative of the temperatures of said stem and said body.

27. A gauging device for measuring the diameter of a cylindrical member comprising:
a clamp member having a rigid body;
means for removably mounting the body of said clamp member in at least partial spaced relationship to a portion of said cylindrical member and thereby directly supporting the clamp member on the portion of said cylindrical member; and
proximity sensing means mounted on said rigid body for sensing any diametral changes in said cylindrical member, said proximity sensing means generating signals responsive to and representative of any sensed diametral changes.

28. A gauging device as set forth in claim 27, which further includes contact points on said body which contact said portion of said cylindrical member and maintain said body in said partial spaced relationship to said portion of said cylindrical member.

29. A gauging device as set forth in claim 28, wherein said rigid body has an inner surface and said contact points comprise a first contact point provided on one side of the inner surface of said body and a second contact point provided on an opposite side of the inner surface of said body.

30. A gauging device as set forth in claim 29, wherein said first and second contact points contact said cylindrical member at respective, spaced positions on the circumference of said cylindrical member corresponding to intersections of a cord thereof with the circumference, the cord being of shorter length than the diameter of said cylindrical member.

31. A gauging device as set forth in claim 27, wherein said body is adapted to slide along the length of said cylindrical member, said proximity sensing means sensing any diametral changes as said body is slid along the length of said cylindrical member.

32. A gauging device as set forth in claim 27, wherein the diametral changes are produced by and are proportional to axial loads imposed on the cylindrical member, further comprising computation means for receiving the signals from said proximity sensing means and determining therefrom the axial load on said cylindrical member.

33. A gauging device as set forth in claim 32, further comprising temperature measuring means, in temperature-sensing association with said cylindrical member, for generating signals indicative of the temperature of said cylindrical member and means for transmitting said temperature indicative signals to said computation means, said computation means responding thereto for compensating for any temperature changes of said cylindrical member in determining the axial load on said cylindrical member.

34. A gauging device as set forth in claim 32, which further includes temperature measuring means, in temperature-sensing association with said body, for generating signals indicative of the temperature of said body and means for transmitting said temperature signals to said computation means, said computation means responding thereto for compensating for any temperature changes of said body in determining the axial load on said cylindrical member.

35. A gauging device as set forth in claim 32, which further includes temperature measuring means, in temperature-sensing association with both said cylindrical member and said body, for generating signals indicative of the respective temperatures of said cylindrical member and said body and means for transmitting said respective temperature indicative signals to said computation means, said computation means responding thereto for compensating for any temperature changes of said cylindrical member and said body in determining the axial load on said cylindrical member.

36. A gauging device as set forth in claim 27, wherein said body is semi-circular in configuration.

37. A gauging device as set forth in claim 27 which includes elastic means attached to said body.

38. A gauging device as set forth in claim 27, wherein said mounting means includes an external support fixture attached to said body.

39. A gauging device as set forth in claim 38, wherein said body is semi-cylindrical in configuration.

40. A device for defining a directly measurable indication of diametral changes of a cylindrical member having a member axis and being of a first axial length and further having an outer surface defined by a first diameter and corresponding first radius, the first diameter and corresponding first radius being variable in accordance with the diametral changes, the diametral changes representing diametral deformations of the cylindrical member produced by respective changes in axial loads on the cylindrical member and being related to the respective axial loads by a fixed mathematical relationship, the device comprising:

a rigid body having a body axis and being of a second axial length substantially smaller than the first axial length, the rigid body comprising an interior surface displaced from the body axis by no less than the first, variable radius and a reference portion displaced from the body axis by a second, fixed radius greater than the first, variable radius and defining a radially aligned measurement axis transverse to the body axis, the rigid body being positionable in an assembled relationship with the cylindrical member substantially coaxially therewith and at a selected axial position and thus at a corresponding outer circumferential surface portion, of limited axial extent, of the cylindrical member and with the interior surface of the rigid body extending in surrounding relationship about and being at least partly, radially spaced from the corresponding outer circumferential surface portion of the cylindrical member, the reference portion of the rigid body defining a radial measurement gap, along the radially aligned measurement circumferential surface portion of the cylindrical member; and means for removably mounting the rigid body to, and thereby for supporting the rigid body on, the cylindrical member in said assembled relationship at a selected axial position along the first axial length, and thus at a selected outer circumferential surface portion of limited axial extent, of the cylindrical member, the removable mounting means being deformable in response to diametral changes corresponding to diametral deformations of the cylindrical member while substantially isolating the rigid body therefrom and permitting displacement of the respective axes thereof while maintaining the measurement axis of the reference portion of the rigid body commonly, radially aligned with the respective aligned radii of the body and the member, the measurement gap accordingly varying in extent as a direct function of, and thus affording a directly measurable indication of, diametral changes of the cylindrical member.

41. A device as recited in claim 40, wherein:
the removable mounting means maintains the substantially coaxial relationship of the member and body axes in the assembled relationship and regardless of diametral changes of the cylindrical member, the radial gap varying directly with, and in substantially the same amount as, the variations in the first radius produced by diametral changes of the cylindrical member.

42. A device as recited in claim 41, wherein:
the removable mounting means mounts the rigid body to the selected portion of the cylindrical member at first and second diametrically opposed positions thereof along a diameter transverse to the measurement axis.

43. A device as recited in claim 40, wherein:
the removable mounting means mounts the rigid body to the selected portion of the cylindrical member at a position thereof displaced by approximately 180° about the body axis from the measurement axis; and
the measurement gap varies directly with, and in substantially the same amount as, the diametral changes, and thus the variations in the first diameter, of the cylindrical member.

44. A device for defining a directly measurable indication of diametral changes of a valve stem having a stem axis and being of a first axial length and further having an outer surface defined by a first diameter and corresponding first radius, the first diameter and corresponding first radius being variable in accordance with diametral changes representing diametral deformations of the valve stem produced by respective changes in axial loads on the valve stem and the diametral deformations being related to the respective axial loads by a fixed mathematical relationship, the device comprising:

a rigid body having a body axis and being of a second axial length substantially smaller than the first axial length, the rigid body comprising an internal surface displaced from the body axis by no less than the first, variable radius and a reference portion displaced from the body axis by a second, fixed radius greater than the first, variable radius and defining a radially aligned measurement axis, the rigid body being positionable in an assembled relationship with the valve stem substantially coaxially therewith and at a selected axial position and thus at a corresponding outer circumferential surface portion, of limited axial extent, of the valve stem and with the interior surface of the rigid body extending in surrounding relationship about and at least partly, radially spaced from the corresponding outer circumferential surface portion of the valve stem, the reference portion of the rigid body defining a radial measurement gap, along the radially aligned measurement axis thereof and relative to the corresponding outer circumferential surface portion of the valve stem; and means for removably mounting the rigid body to, and thereby for supporting the rigid body on, the valve stem in said assembled relationship at a selected axial position along the first axial length, and thus at a selected outer circumferential surface portion of limited axial extent, of the valve stem, the removable mounting means being deformable in response to diametral changes corresponding to diametral deformations of the valve stem while substantially isolating the rigid body therefrom and permitting displacement of the respective axes thereof while maintaining the measurement axis of the reference portion of the rigid body commonly, radially aligned with the respective aligned radii of the body and the valve stem, the measurement gap accordingly varying in extent as a direct function of, and thus affording a directly measurable indication of, diametral changes of the valve stem.

45. A device as recited in claim 44, wherein:

the removable mounting means maintains the substantially coaxial relationship of the valve stem and body axes in the assembled relationship and regardless of diametral changes of the valve stem, the radial gap varying directly with, and in substantially the same amount as, the variations in the first radius produced by diametral changes of the valve stem.

46. A device as recited in claim 45, wherein:
the removable mounting means mounts the rigid body to the selected portion of the valve stem at first and second diametrically opposed positions thereof along a diameter transverse to the measurement axis.

47. A device as recited in claim 44, wherein:
the removable mounting means mounts the rigid body to the selected portion of the valve stem at a position thereof displaced by approximately 180° about the body axis from the measurement axis; and
the measurement gap varies directly with, and in substantially the same amount as, the diametral changes, and thus the variations in the first diameter, of the valve stem.

* * * * *